(12) United States Patent
Hashishita et al.

(10) Patent No.: US 11,687,061 B2
(45) Date of Patent: Jun. 27, 2023

(54) DATA COLLECTION AND ANALYSIS SYSTEM, DATA COLLECTION AND ANALYSIS APPARATUS, MACHINE LEARNING APPARATUS, AND DATA COLLECTION AND ANALYSIS METHOD

(71) Applicant: Mitsubishi Electric Corporation, Tokyo (JP)

(72) Inventors: Masataka Hashishita, Tokyo (JP); Kazumi Iida, Aichi (JP); Hidematsu Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/771,839

(22) PCT Filed: Dec. 26, 2019

(86) PCT No.: PCT/JP2019/051222
§ 371 (c)(1),
(2) Date: Apr. 26, 2022

(87) PCT Pub. No.: WO2021/130983
PCT Pub. Date: Jul. 1, 2021

(65) Prior Publication Data
US 2022/0365515 A1    Nov. 17, 2022

(51) Int. Cl.
*G05B 19/418* (2006.01)

(52) U.S. Cl.
CPC ..... *G05B 19/4183* (2013.01); *G05B 19/4185* (2013.01)

(58) Field of Classification Search
CPC ........................ G05B 19/4183; G05B 19/4185
(Continued)

(56) References Cited

U.S. PATENT DOCUMENTS

| 11,082,197 B2 * | 8/2021 | Yoneda | ............... H04L 45/24 |
| 2022/0147021 A1 * | 5/2022 | Nagata | ............... G05B 19/4183 |

FOREIGN PATENT DOCUMENTS

| CN | 203825819 U | 9/2014 |
| CN | 112513751 A * | 3/2021 ......... G05B 19/4185 |

(Continued)

OTHER PUBLICATIONS

International Search Report and Written Opinion dated Mar. 24, 2020, received for PCT Application PCT/JP2019/051222, Filed on Dec. 26, 2019, 12 pages including English Translation.

(Continued)

*Primary Examiner* — Hien D Khuu
(74) *Attorney, Agent, or Firm* — Xsensus LLP

(57) ABSTRACT

A data collection and analysis system includes a communication unit and a data acquisition unit. The communication unit collects data indicating an internal state or operation state of an equipment item. The data acquisition unit acquires, from the communication unit, the data synchronized for each of groups according to setting information, the setting information being information in which the groups, a data acquisition timing, and a storage location of the data are set for a channel allocated to the data to be acquired from the equipment item, each of the groups bringing together a plurality of the channels, the data acquisition timing being a timing at which the data are acquired from the communication unit.

20 Claims, 9 Drawing Sheets

(58) Field of Classification Search
USPC .......................................................... 700/108
See application file for complete search history.

(56)         References Cited

FOREIGN PATENT DOCUMENTS

| | | | |
|---|---|---|---|
| EP | 3851925 | A1 | 7/2021 |
| JP | 53-120550 | A | 10/1978 |
| JP | 9-230927 | A | 9/1997 |
| JP | 2002157279 | A * | 5/2002 |
| JP | 2010-206350 | A | 9/2010 |
| JP | 2015-80116 | A * | 4/2015 |
| JP | 6237103 | B2 * | 11/2017 |
| JP | 2019-62288 | A | 4/2019 |
| JP | 2019-176299 | A | 10/2019 |
| JP | 2020-46699 | A | 3/2020 |

OTHER PUBLICATIONS

Decision to Grant dated Jul. 14, 2020, received for JP Application 2020-532075, 5 pages including English Translation.
Chinese Office Action dated Jan. 28, 2023, in corresponding Chinese Patent Application No. 201980103197.2, 18pp.

* cited by examiner

FIG.8

| CHANNEL NUMBER | GROUP | DATA TYPE | DATA ACQUISITION TIMING | ACQUISITION INTERVAL | STORAGE LOCATION |
|---|---|---|---|---|---|
| 1 | GROUP A | DIRECT | ***** | ***** | ***** |
| 2 | GROUP A | DIRECT | ***** | ***** | ***** |
| 3 | GROUP A | INDIRECT | ***** | ***** | ***** |
| 4 | GROUP A | INDIRECT | ***** | ***** | ***** |
|   | GROUP B |   | ***** |   | ***** |
| 5 | GROUP B | DIRECT | ***** | ***** | ***** |
| 6 | GROUP B | DIRECT | ***** | ***** | ***** |
| 7 | GROUP B | DIRECT | ***** | ***** | ***** |
|   | GROUP C |   | ***** |   | ***** |
| 8 | GROUP C | DIRECT | ***** | ***** | ***** |

DATA COLLECTION AND ANALYSIS SYSTEM, DATA COLLECTION AND ANALYSIS APPARATUS, MACHINE LEARNING APPARATUS, AND DATA COLLECTION AND ANALYSIS METHOD

CROSS-REFERENCE TO RELATED APPLICATION

The present application is based on PCT filing PCT/JP2019/051222, filed Dec. 26, 2019, the entire contents of which are incorporated herein by reference.

FIELD

The present disclosure relates to a data collection and analysis system, a data collection and analysis apparatus, a machine learning apparatus, and a data collection and analysis method for analyzing a state of a facility by using maintenance data collected from an equipment item.

BACKGROUND

In recent years, an equipment item diagnosis system has been provided which enables an operation state of an equipment item to be analyzed on a user side. In the equipment item diagnosis system, for example, predictive maintenance of an equipment item is performed by use of data acquired from a plurality of sensors attached to the equipment item, and results of the predictive maintenance are systematically managed.

Patent Literature 1 discloses a process monitoring system that systematically manages results of predictive maintenance. In the process monitoring system described in Patent Literature 1, multiple measuring instruments as detectors configuring a process to be monitored are divided into groups that are process divisions in accordance with the work form of a monitor. In addition, wires for synchronization are connected to measuring instruments belonging to the same group. Then, data on images, vibration information, and measurement information from all the measuring instruments in the group are acquired in synchronization, and the acquired data are displayed on the same screen.

CITATION LIST

Patent Literature

Patent Literature 1: Japanese Patent Application Laid-open No. 9-230927

SUMMARY

Technical Problem

However, in the technique described in Patent Literature 1, in a case where the data on images, vibration information, and measurement information are acquired in synchronization from a plurality of measuring instruments, wires for synchronization need to be connected in advance to the measuring instruments to be synchronized. In addition, in order to perform predictive maintenance of an equipment item, synchronized data need to be acquired from all the measuring instruments that are detectors in the group. Otherwise, predictive maintenance of the equipment item cannot be performed. In one example, in a case where data acquired from measuring instruments freely grouped afterward are not synchronized data, even if there is an anomaly in any of the data, it is not possible to diagnose the anomaly in the data. This is because the data are not synchronized. However, the technique described in Patent Literature 1 does not consider a method for synchronizing data acquired from measuring instruments that are detectors freely grouped afterward.

The present disclosure has been made in view of the above, and an object thereof is to obtain a data collection and analysis system capable of ensuring synchronization between data acquired from detectors freely grouped afterward.

Solution to Problem

In order to solve the above-described problems and achieve the object, a data collection and analysis system of the present disclosure includes a communication unit and a data acquisition unit. The communication unit collects data indicating an internal state or operation state of an equipment item. The data acquisition unit acquires, from the communication unit, the data synchronized for each of groups according to setting information, the setting information being information in which the groups, a data acquisition timing, and a storage location of the data are set for a channel allocated to the data to be acquired from the equipment item, each of the groups bringing together a plurality of the channels, the data acquisition timing being a timing at which the data are acquired from the communication unit.

Advantageous Effects of Invention

The data collection and analysis system according to the present disclosure has the effect of enabling synchronization between data to be ensured, the data being acquired from detectors freely grouped afterward.

BRIEF DESCRIPTION OF DRAWINGS

FIG. 8 is a diagram showing an example of setting information according to a third embodiment.

DESCRIPTION OF EMBODIMENTS

Hereinafter, a data collection and analysis system, a data collection and analysis apparatus, a machine learning apparatus, and a data collection and analysis method according to each embodiment of the present disclosure will be described in detail with reference to the drawings. Note that the present disclosure is not limited to the embodiments.

First Embodiment

Figure 1:
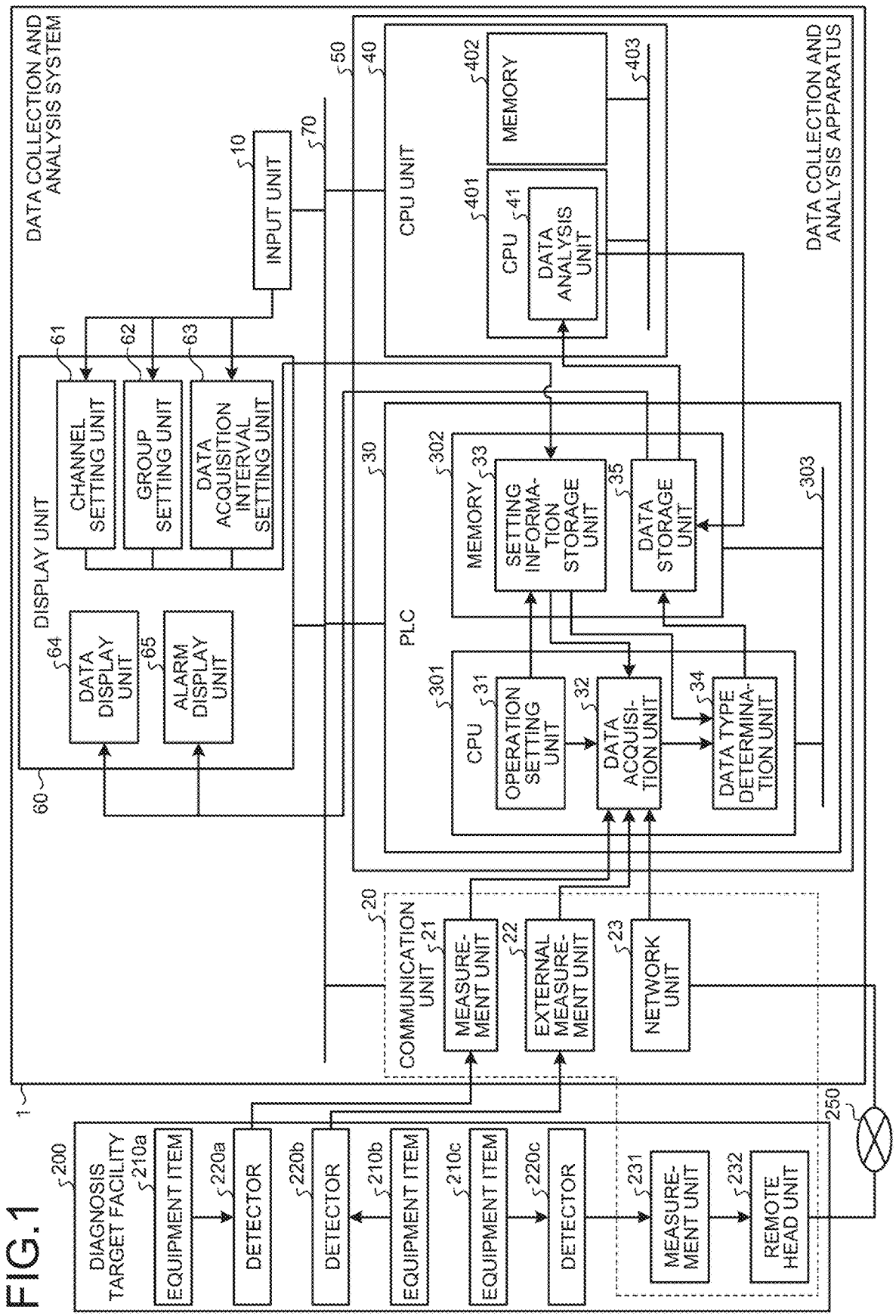
FIG. 1 is a block diagram schematically showing an example of a configuration of a data collection and analysis system according to a first embodiment.

FIG. 1 is a block diagram schematically showing an example of a configuration of a data collection and analysis system according to a first embodiment. A data collection and analysis system 1 is an apparatus that acquires data necessary for performing predictive maintenance of a diagnosis target facility 200 from detectors 220a, 220b, and 220c provided in equipment items 210a, 210b, and 210c, and analyzes the data. In one example, the diagnosis target facility 200 includes a plurality of the equipment items 210a, 210b, and 210c, and the detectors 220a, 220b, and 220c that detect internal states or operation states of the equipment items 210a, 210b, and 210c, respectively. The detectors 220a, 220b, and 220c are detectors for measurement, and are, for example, sensors such as vibration sensors, temperature sensors, or voltage sensors.

The detectors 220a, 220b, and 220c output detected data, that is, data indicating the internal states or operation states of the equipment items 210a, 210b, and 210c, respectively, to the data collection and analysis system 1. Note that the data indicating the internal states or operation states of the equipment items 210a, 210b, and 210c may be not only data detected by the detectors 220a, 220b, and 220c, but also data output in a sensorless manner, such as internal current or voltage waveforms of the equipment items 210a, 210b, and 210c. The equipment items 210a, 210b, and 210c may be located physically close to the data collection and analysis system 1, or may be located physically far from the data collection and analysis system 1. Here, assume that the equipment items 210a and 210b are located physically close to the data collection and analysis system 1, and that the equipment item 210c is located physically farther from the data collection and analysis system 1 than the equipment items 210a and 210b.

The data collection and analysis system 1 includes an input unit 10, a communication unit 20, a programmable logic controller (PLC) 30, a central processing unit (CPU) unit 40, and a display unit 60. The input unit 10, the communication unit 20, the PLC 30, the CPU unit 40, and the display unit 60 are connected via a bus line 70. In addition, the PLC 30 and the CPU unit 40 are included in a data collection and analysis apparatus 50.

The input unit 10 receives an input operation performed by a user. Examples of the input unit 10 include a keyboard, a button, and a mouse. The input unit 10 receives details of user input such as a detector data setting, a channel setting, a group setting, and a data acquisition interval setting to be described below.

The communication unit 20 is a communication unit that collects data necessary for performing predictive maintenance from the diagnosis target facility 200 via wires or a network 250. The communication unit 20 has the function of collecting data from the equipment items 210a and 210b via the wires and the function of collecting data from the equipment item 210c via a remote head unit 232. The remote head unit 232 transmits data from the equipment item 210c to the communication unit 20 via the network 250. The communication unit 20 includes a measurement unit 21 and an external measurement unit 22. The measurement unit 21 outputs, to a data acquisition unit 32 in the PLC 30, data acquired from the detector 220a provided in the equipment item 210a located physically close to the data collection and analysis system 1. The external measurement unit 22 outputs, to the data acquisition unit 32 in the PLC 30, data acquired from the detector 220b provided in the equipment item 210b located physically close to the data collection and analysis system 1.

The external measurement unit 22 is used to acquire data of a special sensor that cannot be connected to the measurement unit, or acquire data of the detector 220b connected to the equipment item 210b that is an external equipment item not connected to the data collection and analysis system 1.

Furthermore, the communication unit 20 includes a measurement unit 231, the remote head unit 232, and a network unit 23. The measurement unit 231 acquires data from the detector 220c provided in the equipment item 210c located far from the data collection and analysis system 1. The remote head unit 232 is a device that is used when the equipment item 210c is located far from the data collection and analysis system 1. The measurement unit 231 outputs data acquired from the detector 220c, which is provided in the equipment item 210c, to the PLC 30 via the remote head unit 232. Here, when the measurement unit 231 and the detectors 220a, 220b, and 220c cannot be connected by wires, but are connected via the network 250, the detectors 220a, 220b, and 220c are described as being physically located far.

The remote head unit 232 is a remote station that connects the measurement unit 231 and the network unit 23 via the network 250. In this case, the detector 220c is attached to the equipment item 210c, the measurement unit 231 is connected to the detector 220c via a wire, and the remote head unit 232 is connected to the measurement unit 231. The network 250 may be a wired network or a wireless network.

The network unit 23 communicates with the remote head unit 232 according to a predetermined protocol, and outputs, to the data acquisition unit 32 in the PLC 30, data acquired by the measurement unit 231 from the detector 220c. In the following embodiments, the measurement unit 21, the external measurement unit 22 and the network unit 23 serve as the communication unit 20. The measurement unit 21 and the external measurement unit 22 can be connected to the detectors 220a and 220b, respectively, via the wires. The network unit 23 is connected to the measurement unit 231 connected to the detector 220c via the remote head unit 232 and the network 250. That is, in the example of FIG. 1, although the measurement unit 231 and the remote head unit 232 are provided on the diagnosis target facility 200 side, the measurement unit 231 and the remote head unit 232 are included in the communication unit 20 of the data collection and analysis system 1. As described above, in the data collection and analysis system 1, the measurement unit 21, the external measurement unit 22, and the measurement unit 231 are included in the communication unit 20 regardless of each installation location. The measurement unit 21, the external measurement unit 22, and the measurement unit 231 acquire data from the detectors 220a, 220b, and 220c, respectively. Note that although FIG. 1 illustrates a case where the measurement unit 231 is connected to the remote head unit 232, an external measurement unit may be connected to the remote head unit 232 in addition to the measurement unit 231.

In one example, the external measurement unit 22 and the remote head unit 232 are used for connection with the detectors 220b and 220c grouped afterward.

The PLC 30 acquires data collected by the communication unit 20. The PLC 30 includes an operation setting unit 31, the data acquisition unit 32, a setting information storage unit 33, a data type determination unit 34, and a data storage unit 35.

An operation setting screen is a screen on which the user makes settings for the detectors 220a, 220b, and 220c. The operation setting unit 31 reflects, in the communication unit 20, the PLC 30, and the CPU unit 40, details of the settings the user has made on the operation setting screen via the input unit 10.

The data acquisition unit 32 has a plurality of channels for data collection, and collects data from the measurement unit 21, the external measurement unit 22, and the remote head unit 232 via the channels with reference to setting information to be described below. In one example, the channels are data input/output terminals. Each channel corresponds to one of the detectors 220a, 220b, and 220c connected to the measurement unit 21, the external measurement unit 22, and the measurement unit 231, respectively.

Figure 2:
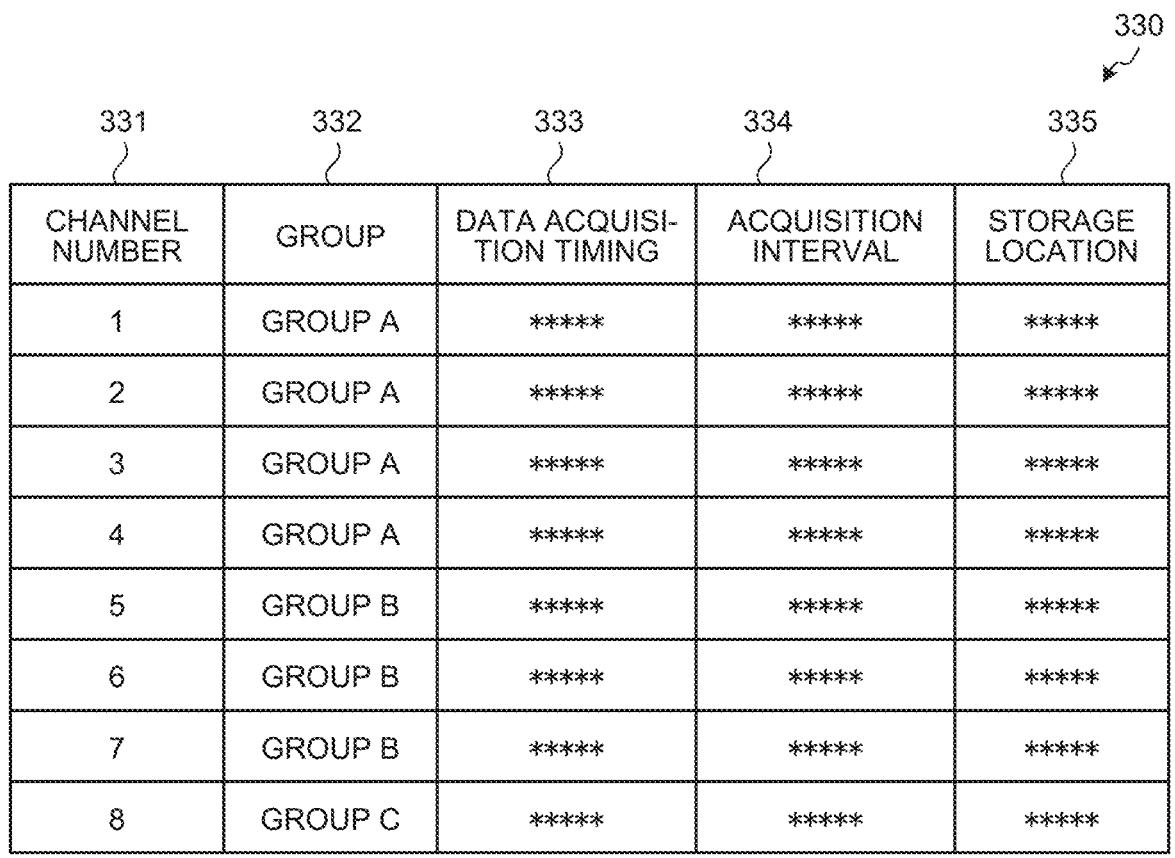
FIG. 2 is a diagram showing an example of setting information according to the first embodiment.

The setting information storage unit 33 stores setting information to be set for a channel when the data acquisition unit 32 acquires data. FIG. 2 is a diagram showing an example of the setting information according to the first embodiment. Setting information 330 includes a channel number 331 for identifying a channel, a group 332, a data acquisition timing 333, an acquisition interval 334, and a storage location 335. The group 332 is information for identifying a group to which a channel indicated by the channel number 331 belongs. The data acquisition timing 333 indicates a timing at which data are acquired. In one example, the data acquisition timing 333 is determined by a counter value for acquiring data, but is not limited thereto. The data acquisition timing 333 may be time or a trigger timing for data acquisition as long as synchronization between data of the plurality of channels can be achieved. The acquisition interval 334 indicates an interval of data acquisition. In one example, after data are acquired at a timing set in the data acquisition timing 333, the next data are acquired at time intervals set in the acquisition interval 334. The storage location 335 indicates a location in the data storage unit 35 where the acquired data are stored. In one example, the storage location 335 is a data address.

With regard to the channels that the data acquisition unit 32 has, a group to which each of the channels belongs is set in the setting information 330 as illustrated in FIG. 2. That is, a group brings together a plurality of channels. Furthermore, the timing of data acquisition in each group is defined by the data acquisition timing 333 and the acquisition interval 334. In addition, a location for storing acquired data is defined by the storage location 335. Note that the same timing is set as the data acquisition timing 333 for channels belonging to the same group.

The data acquisition unit 32 acquires data for each group from the measurement units 21 and 231 and the external measurement unit 22 according to the setting information 330. In one example, the data acquisition unit 32 sets the data acquisition timing 333 for the measurement units 21 and 231 and the external measurement unit 22 according to the setting information 330, and acquires data from the measurement units 21 and 231 and the external measurement unit 22 for each group. The data acquisition unit 32 checks the group 332 of the setting information 330, and selects channels belonging to the same group, for example, "group A". The data acquisition unit 32 sets the same data acquisition timing 333 for the channels in the same group. Subsequently, the data acquisition unit 32 acquires data from the measurement units 21 and 231 and the external measurement unit 22 based on intervals set in the acquisition interval 334 of the setting information 330, and outputs the acquired data to the data type determination unit 34. Note that the data acquisition unit 32 may synchronize data by correcting time at which data for each group are acquired, according to the setting information 330.

With reference to the setting information 330, the data type determination unit 34 adjusts a difference in synchronization timing for channel data acquired via the remote head unit 232, and stores the adjusted data in the data storage unit 35. The data type determination unit 34 directly stores, in the data storage unit 35, channel data acquired without involving the remote head unit 232. This is because synchronization timing for the measurement unit 21 and the external measurement unit 22, which are not connected to the remote head unit 232, differs from synchronization timing for the measurement unit 231, which is connected to the remote head unit 232, due to the effect of, for example, the timing of a data interrupt generated by the remote head unit 232.

Note that the data type determination unit 34 can adjust the difference in synchronization timing by any desired method. In one example, the data type determination unit 34 directly measures a difference in data synchronization timing, and corrects an acquisition time difference corresponding to the difference. The acquisition time difference refers to a difference between acquisition time at which data are acquired via the remote head unit 232 and acquisition time at which data are acquired not via the remote head unit 232, for channels belonging to the same group. In another example, the data type determination unit 34 may have a correction value corresponding to the difference in synchronization timing, and may correct time of data acquired from the remote head unit 232 by using the correction value corresponding to the difference in synchronization timing.

The data storage unit 35 stores data acquired from the measurement unit 21 and the external measurement unit 22, and data acquired via the remote head unit 232. The data acquired via the remote head unit 232 are stored after correction of the difference in synchronization timing. In addition, the data storage unit 35 stores data analyzed by a data analysis unit 41 of the CPU unit 40 to be described below.

The PLC 30 includes a CPU 301 and a memory 302. The CPU 301 and the memory 302 are connected via a bus line 303. The operation setting unit 31, the data acquisition unit 32, and the data type determination unit 34 are each implemented by execution of a program (not illustrated) stored in the memory 302. The memory 302 includes the setting information storage unit 33 and the data storage unit 35.

The CPU unit 40 is a unit intended to perform more advanced data processing than the PLC 30. A C language programmable unit is an example of the CPU unit 40. In addition, the CPU unit 40 corresponds to an arithmetic unit. The CPU unit 40 includes the data analysis unit 41 that analyzes data acquired from the PLC 30. The data analysis unit 41 makes a diagnosis of the diagnosis target facility 200 by applying an effective diagnosis method to data for each group in the data storage unit 35. The data analysis unit 41 stores a result of the diagnosis in the data storage unit 35 of the PLC 30. Various sensors are used to diagnose anomalies in the equipment items 210a, 210b, and 210c. Meanwhile, a generally used method is a method based on vibration measurement in which a vibration sensor is used. Vibration measurement has two advantages. First, in the case of using a piezoelectric vibration sensor, vibration measurement is advantageous because the piezoelectric vibration sensor is inexpensive, robust, and highly accurate. Therefore, vibration measurement is used to diagnose an anomaly in a production facility under severe environments such as high temperature and high humidity. Second, vibration analysis methods, that is, vibration diagnosis methods, have been systematically established. Vibration diagnosis methods include simple diagnosis and detailed diagnosis.

In the simple diagnosis, the vibration state level of a facility is compared with a reference value considered a normal level, and it is determined that a measured value indicates an anomaly when the measured value exceeds the reference value. Methods for simple diagnosis include an absolute value determination method and a relative value determination method.

The absolute value determination method is a method for determining whether the state of a facility is good or bad based on comparison with a determination reference value defined in International Organization for Standardization (ISO) or Japanese Industrial Standards (JIS). Furthermore, in the relative value determination method, after vibration data are collected, a reference value considered a normal level is generated based on the vibration data, and is multiplied by a certain multiplying factor to set a threshold value. In this method, it is determined that a measured value indicates an anomaly when the measured value exceeds the threshold value. In addition, the detailed diagnosis is a method for making a diagnosis by calculating a failure frequency of a machine part such as a bearing or a gear in advance and monitoring the failure frequency.

Furthermore, in addition to the vibration diagnosis method, the Mahalanobis Taguchi method (MT method) can be cited as a method for making a diagnosis by extracting and analyzing feature amounts of multiple pieces of detector data set in a group. In the MT method, pieces of data acquired from a system in a normal state are collected, and a population of the system in the normal state is generated on the basis of the data. The population is called a unit space. Thereafter, pieces of newly acquired data are plotted in a coordinate space where the unit space exists, and the Mahalanobis distance is calculated which represents the degree of deviation from the unit space. Then, it is determined whether the system is normal or anomalous based on comparison between the calculated Mahalanobis distance and a preset threshold value of the Mahalanobis distance.

In addition, the data collection and analysis system 1 can accurately and quickly diagnose anomaly detection by using the above-described vibration analysis method and a statistical analysis method such as the above-described MT method in combination.

After making a diagnosis of data for each group by using the above method, the data analysis unit 41 stores each diagnostic result in the data storage unit 35 in association with a corresponding group to which the data subjected to diagnosis belong. In one example, when making a diagnosis of data for "group A", the data analysis unit 41 stores, in the data storage unit 35, a diagnostic result in association with "group A".

The CPU unit 40 includes a CPU 401 and a memory 402. The CPU 401 and the memory 402 are connected via a bus line 403. The data analysis unit 41 is implemented by execution of a program (not illustrated) stored in the memory 402.

The display unit 60 sets the setting information 330 for predictive maintenance of the diagnosis target facility 200, and displays a diagnostic result analyzed by the CPU unit 40. The display unit 60 includes a channel setting unit 61, a group setting unit 62, a data acquisition interval setting unit 63, a data display unit 64, and an alarm display unit 65.

A setting screen is a screen on which the user makes settings for the setting information 330. The channel setting unit 61 reflects setting details related to a channel in the setting information 330 of the setting information storage unit 33. The setting details related to the channel are included in details of settings the user has made on the setting screen via the input unit 10. A channel name can be set for each channel of the data collection and analysis system 1. Channels are allocated in units of channels to detector data to be acquired, on the basis of the set channel names. The setting screen is stored in a memory (not illustrated) in the display unit 60.

The group setting unit 62 reflects setting details related to a group in the setting information 330 of the setting information storage unit 33. The setting details related to the group are included in the details of the settings the user has made on the setting screen via the input unit 10. Therefore, the data collection and analysis system 1 can manage the detector data acquired through channels in units of groups. Groups can be set in units of devices, regions, or lines. It is possible to collectively manage data necessary for predictive maintenance by managing detector data in units of groups, and it is possible to perform predictive maintenance based on the necessary data by analyzing data for this group.

All channels set in the same group allow detector data to be acquired at the same timing. That is, the group setting unit 62 sets the data acquisition timing 333 to the same value for the channels set in the same group in the setting information 330. Therefore, the data collection and analysis system 1 can acquire detector data in which synchronization between channels in the same group is ensured, simply by setting groups for channels. In addition, when stored in the data storage unit 35, the detector data are grouped and can be associated.

The data acquisition interval setting unit 63 reflects setting details related to a data acquisition interval in the setting information 330 of the setting information storage unit 33. The setting details related to the data acquisition interval are included in the details of the settings the user has made on the setting screen via the input unit 10. The setting of the data acquisition interval includes period monitoring or trigger monitoring.

The data display unit 64 presents diagnostic data stored in the data storage unit 35 or detector data acquired by the data acquisition unit 32 to the user of the data collection and analysis system 1 by using a graphical operation terminal, that is, a display.

The alarm display unit 65 notifies the user of the result of diagnosis made by the data analysis unit 41. Furthermore, assume a case where diagnostic results are classified into three levels of normal, caution, and anomaly. When a diagnostic result is classified as caution or anomaly, the alarm display unit 65 notifies the user of details of an alarm. A text message indicating a diagnosis to which the alarm has been issued can be used as the details of the alarm. In one example, the alarm display unit 65 may display, as a diagnostic result or an alarm, diagnostic result data or alarm display data stored in a memory (not illustrated) in the display unit 60, on the graphical operation terminal. Alternatively, the alarm display unit 65 may notify the user of the diagnostic result or the alarm by means of e-mail or the like.

Note that the data collection and analysis system 1 described above may be not only a system including an assembled unit, but also a system in which a device is provided with the function of the unit.

As described above, in the data collection and analysis system 1 according to the first embodiment, the data acquisition unit 32 acquires data based on setting values in the setting information 330 in which conditions for acquiring data are set for each group. As a result, even for groups freely set afterward, it is possible to acquire data for each group in synchronization without connecting special wires.

In addition, the data collection and analysis system 1 according to the first embodiment can freely set the group 332 for channels, and sets the data acquisition timing 333 for the group name of the group 332 set as described above. Therefore, it is possible to easily achieve synchronous data acquisition for all the pieces of acquired data in the group 332 freely set by the user.

Note that a case where the operation setting unit 31 is provided in the PLC 30 has been shown in the above description, but the operation setting unit 31 may be provided in the CPU unit 40.

Figure 3:
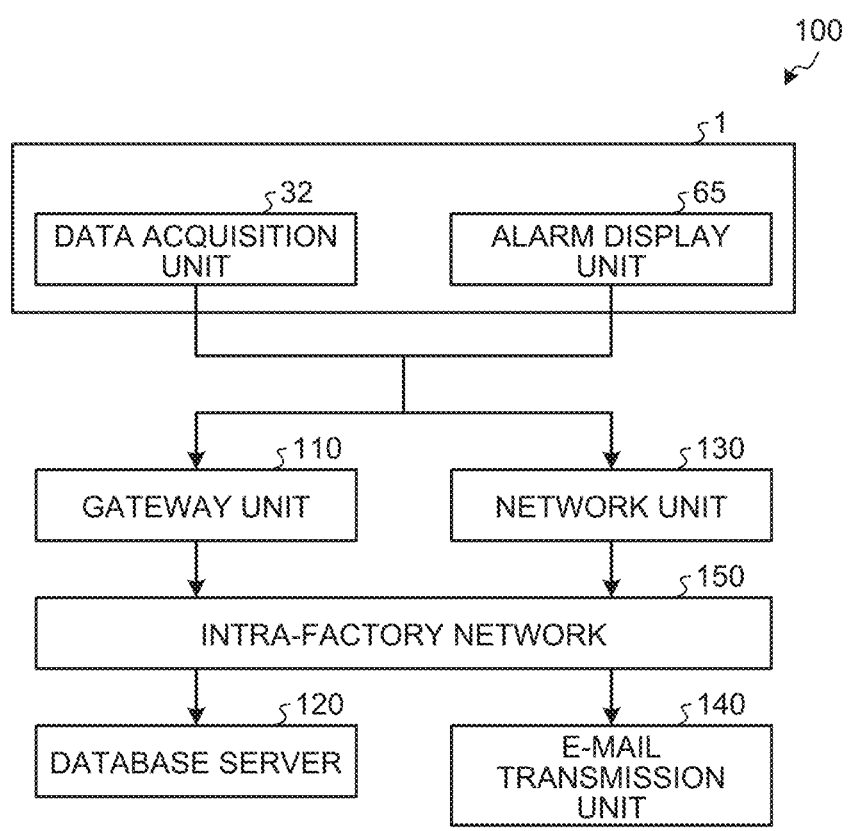
FIG. 3 is a block diagram schematically showing an example of a configuration of an equipment item diagnosis system using the data collection and analysis system according to the first embodiment.

FIG. 3 is a block diagram schematically showing an example of a configuration of an equipment item diagnosis system using the data collection and analysis system according to the first embodiment. An equipment item diagnosis system 100 includes the data collection and analysis system 1 according to the first embodiment, a gateway unit 110, a database server 120, a network unit 130, an e-mail transmission unit 140, and an intra-factory network 150. In the drawing, for convenience of description, illustration of constituent elements other than the data acquisition unit 32 and the alarm display unit 65 is omitted in the data collection and analysis system 1.

The intra-factory network 150 is a network in a factory including the diagnosis target facility 200. The database server 120 is an information processing device that stores, in the form of a database, data collected by the data collection and analysis system 1 and diagnostic results. The e-mail transmission unit 140 is an information processing device that notifies the user of a diagnostic result in accordance with an instruction from the data collection and analysis system 1.

In the equipment item diagnosis system 100 as described above, the data collection and analysis system 1 transfers measurement data collected from the equipment items 210a, 210b, and 210c of the diagnosis target facility 200 and results of diagnosis made in the data collection and analysis system 1, to the database server 120 via the intra-factory network 150 by using the gateway unit 110.

In addition, the data acquisition unit 32 in the data collection and analysis system 1 collects measurement data from the equipment items 210a, 210b, and 210c of the diagnosis target facility 200 via the intra-factory network 150 by using the network unit 130. Furthermore, the alarm display unit 65 issues an instruction to the e-mail transmission unit 140 via the network unit 130 and the intra-factory network 150, and causes the e-mail transmission unit 140 to notify the user of a diagnostic result by e-mail.

Figure 4:
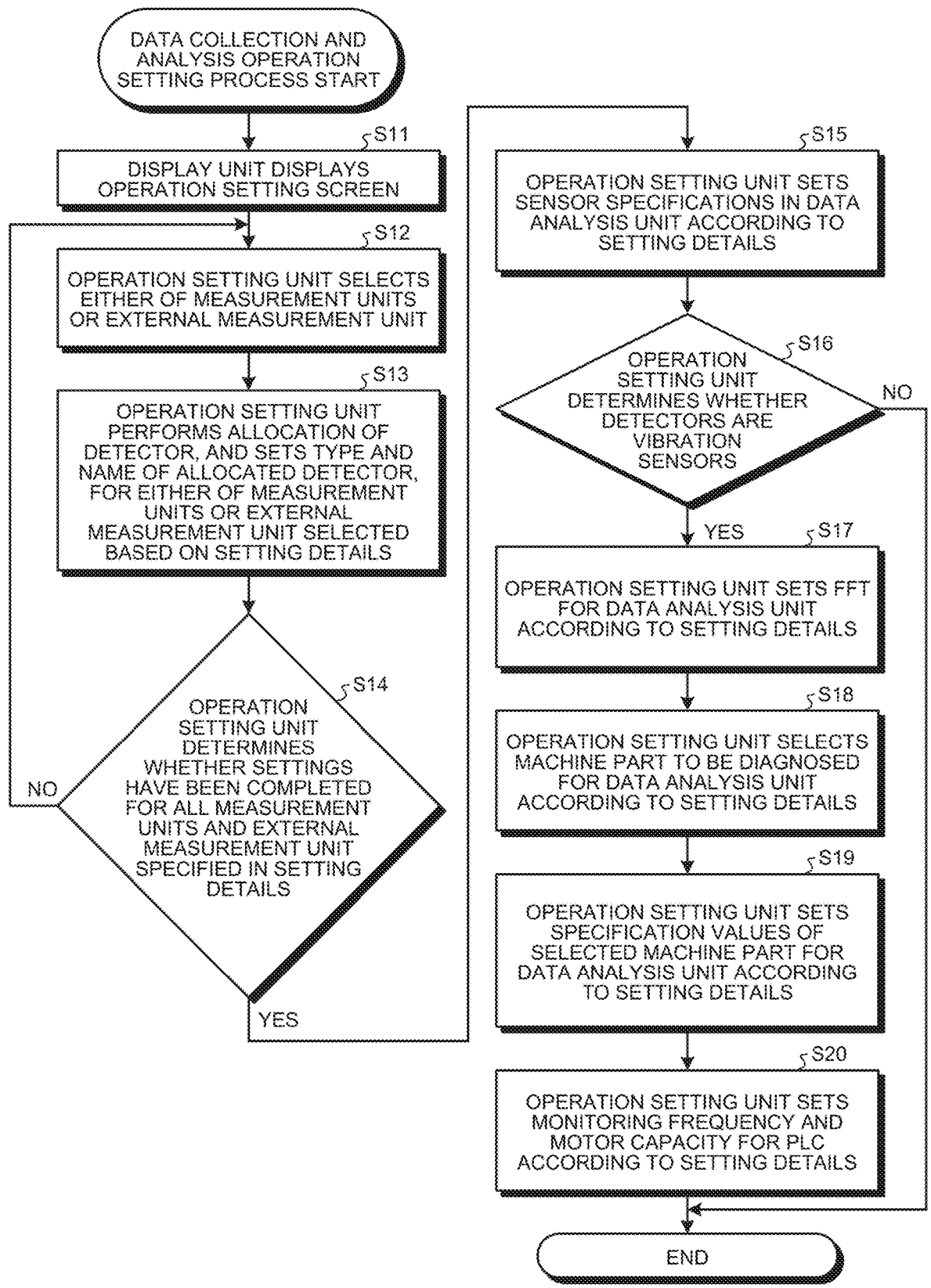
FIG. 4 is a flowchart showing an example of a data collection and analysis operation setting procedure to be performed by the data collection and analysis system according to the first embodiment.

Next, operation in the data collection and analysis system 1 will be described. FIG. 4 is a flowchart showing an example of a data collection and analysis operation setting procedure to be performed by the data collection and analysis system according to the first embodiment. The display unit 60 displays the operation setting screen for making settings for the data collection and analysis operation (step S11).

The user connects each of the detectors 220a, 220b, and 220c respectively installed in the equipment items 210a, 210b, and 210c of the diagnosis target facility 200 to the measurement unit 21 or 231 or the external measurement unit 22 by a wire or the network 250. The user inputs details of the result of connection on the operation setting screen via the input unit 10. In one example, the user allocates each of the detectors 220a, 220b, and 220c to the measurement unit 21 or 231 or the external measurement unit 22, and sets the types of the allocated detectors 220a, 220b, and 220c and names to be given to the allocated detectors 220a, 220b, and 220c. In addition, the user sets specifications of the detectors 220a, 220b, and 220c. In a case where the detectors 220a, 220b, and 220c are vibration sensors, the user sets a fast Fourier transform (FFT) for transforming acquired data into frequency data, a machine part to be diagnosed, specification values of the machine part, a monitoring frequency, and a motor capacity.

When the user finishes inputting the setting details on the operation setting screen, and the operation setting unit 31 of the PLC 30 receives an instruction to reflect the setting details, the operation setting unit 31 selects either the measurement unit 21 or 231 or the external measurement unit 22 based on the setting details (step S12).

The operation setting unit 31 performs allocation of the detector 220a, 220b, or 220c, and sets the type and name of the allocated detector 220a, 220b, or 220c, for either the measurement unit 21 or 231 or the external measurement unit 22 selected based on the setting details (step S13).

Thereafter, the operation setting unit 31 determines whether settings have been completed for all the measurement units 21 and 231 and the external measurement unit 22 specified in the setting details (step S14). When settings have not been completed for any of the measurement units 21 and 231 and the external measurement unit 22 specified in the setting details (No in step S14), the process returns to step S12, and the operation setting unit 31 repeatedly performs the processing in steps S12 and S13 until the settings are completed for all the measurement units 21 and 231 and the external measurement unit 22 specified in the setting details.

In addition, when settings have been completed for all the measurement units 21 and 231 and the external measurement unit 22 specified in the setting details (Yes in step S14), the operation setting unit 31 sets sensor specifications in the data analysis unit 41 of the CPU unit 40 according to the setting details (step S15). Thereafter, the operation setting unit 31 determines whether the detectors 220a, 220b, and 220c are vibration sensors (step S16).

When the detectors 220a, 220b, and 220c are vibration sensors (Yes in step S16), the operation setting unit 31 sets the FFT for the data analysis unit 41 according to the setting details (step S17). The setting of the FFT includes a condition for frequency transform of data from the vibration sensors by the FFT. Next, the operation setting unit 31 selects a machine part to be diagnosed (step S18), and sets specification values of the selected machine part (step S19), for the data analysis unit 41 according to the setting details. Furthermore, the operation setting unit 31 sets a monitoring frequency and a motor capacity for the PLC 30 according to the setting details (step S20). Then, the data collection and analysis operation setting process ends. In addition, when the detectors 220a, 220b, and 220c are not vibration sensors in step S16 (No in step S16), the data collection and analysis operation setting process also ends.

In the above description, the operation setting unit 31 of the PLC 30 makes settings for the data collection and analysis operation. Meanwhile, another method may be used to make settings for the data collection and analysis operation. In one example, the above-described settings may be made for the communication unit 20, the PLC 30, and the CPU unit 40 by use of an engineering tool (not illustrated).

Figure 5:
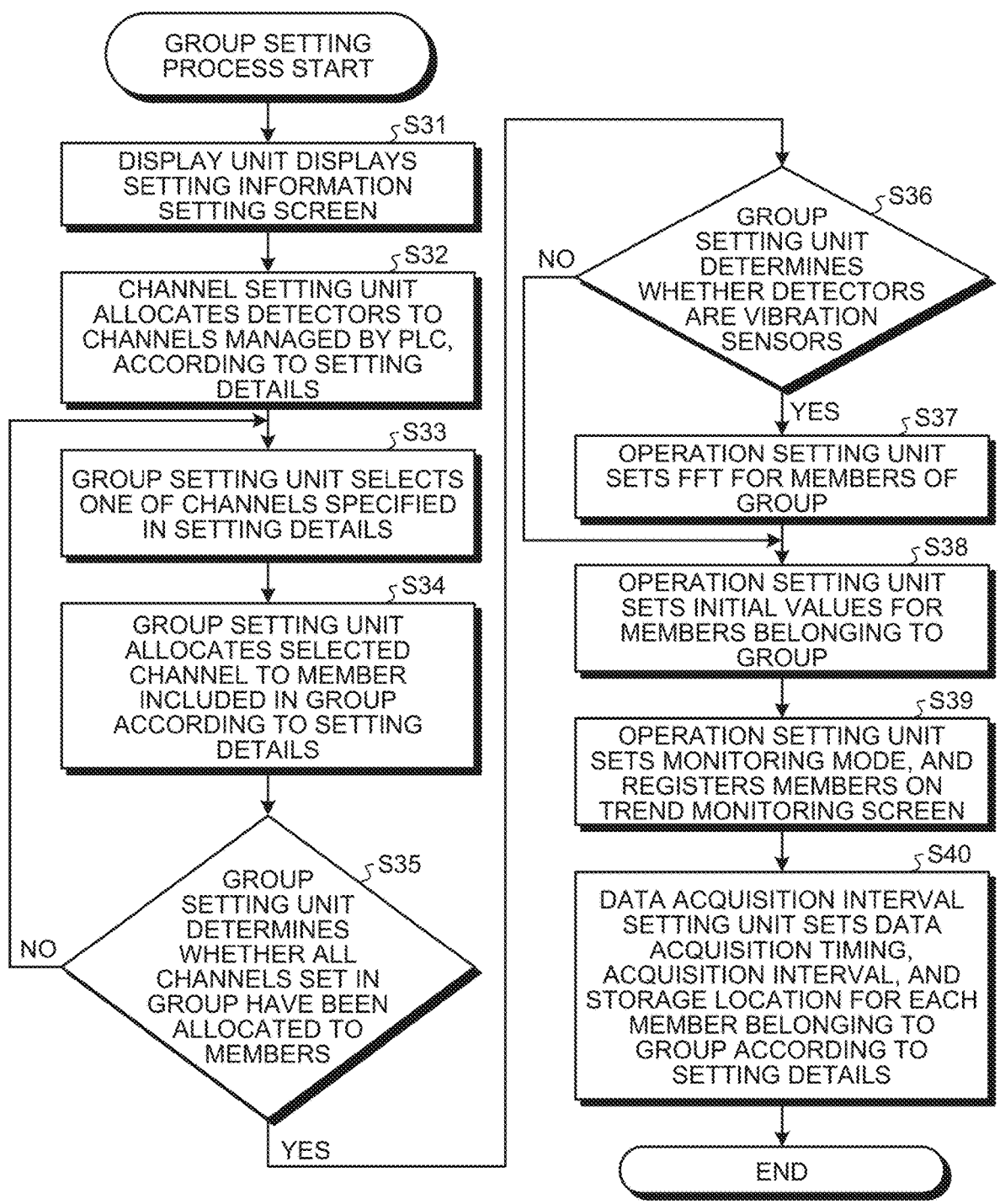
FIG. 5 is a flowchart showing an example of a procedure for a group setting process according to the first embodiment.

FIG. 5 is a flowchart showing an example of a procedure for a group setting process according to the first embodiment. The display unit 60 displays the setting information setting screen (step S31). On the setting information setting screen, the user allocates the detectors 220*a*, 220*b*, and 220*c* to channels managed by the PLC 30, and makes settings for the grouping of the channels and settings for causing the detectors 220*a*, 220*b*, and 220*c*, which are members belonging to a group, to acquire data by the same data acquisition method. In addition, when the detectors 220*a*, 220*b*, and 220*c* are vibration sensors, the user sets the FFT for the members on the setting information setting screen. Furthermore, the user sets initial values for the members, sets a monitoring mode, and registers the members on a trend monitoring screen, by using the setting information setting screen. In one example, the setting of the monitoring mode is a setting for specifying which of the detailed diagnosis, the simple diagnosis, and the MT method diagnosis is used for diagnosis. The trend monitoring is a function of monitoring a time-series variation of acquired data, that is, the trend of the acquired data. The member registration on the trend monitoring screen is to specify a target, that is, a member for which the trend of data is graphically displayed on the data display unit 64.

The channel setting unit 61 allocates the detectors 220*a*, 220*b*, and 220*c* to the channels managed by the PLC 30 according to setting details of the setting information setting screen (step S32). In one example, the channel setting unit 61 reflects setting details related to channel allocation in the setting information 330 in the setting information storage unit 33 of the PLC 30.

Next, the group setting unit 62 selects one of channels specified in the setting details (step S33), and allocates the selected channel to a member included in the group, that is, the detector 220*a*, 220*b*, or 220*c* according to the setting details (step S34). Thereafter, the group setting unit 62 determines whether all the channels set in the group have been allocated to the members (step S35). That is, the group setting unit 62 determines whether all the detectors 220*a*, 220*b*, and 220*c* connected to the group have been allocated to the members. When not all the channels set in the group have been allocated to the members (No in step S35), the process returns to step S33.

Furthermore, when all the channels set in the group have been allocated to the members (Yes in step S35), the group setting unit 62 determines whether the detectors 220*a*, 220*b*, and 220*c* are vibration sensors (step S36). When the detectors 220*a*, 220*b*, and 220*c* are vibration sensors (Yes in step S36), the operation setting unit 31 of the PLC 30 sets the FFT for the members of the group (step S37).

After step S37, or when the detectors 220*a*, 220*b*, and 220*c* are not vibration sensors in step S36 (No in step S36), the operation setting unit 31 sets initial values for the members belonging to the group (step S38). In addition, the operation setting unit 31 sets the monitoring mode, and registers the members on the trend monitoring screen (step S39). Moreover, the data acquisition interval setting unit 63 sets the data acquisition timing 333, the acquisition interval 334, and the storage location 335 for each member belonging to the group according to the setting details (step S40). In one example, the data acquisition interval setting unit 63 reflects the data acquisition timing 333, the acquisition interval 334, and the storage location 335 in the setting information 330 in the setting information storage unit 33. Thus, the process ends.

After the data collection and analysis operation setting process and the group setting process are performed in this manner, a data collection and analysis method is executed in the data collection and analysis system 1. In the data collection and analysis method, first, the PLC 30 acquires synchronized data from the communication unit 20 for each group according to the setting information 330 set for the channels allocated to data to be acquired from the equipment items 210*a*, 210*b*, and 210*c*. Next, the CPU unit 40 analyzes the acquired data for each group. Thus, the data collection and analysis method ends.

The data collection and analysis system 1 of the first embodiment groups channels managed by the PLC 30, and collects data from the detectors 220*a*, 220*b*, and 220*c* respectively connected to the equipment items 210*a*, 210*b*, and 210*c* of the diagnosis target facility 200 according to the setting information 330 in which the data acquisition interval is set for each group. As a result, simultaneity and synchronousness of collection data from a plurality of the detectors 220*a*, 220*b*, and 220*c* are achieved, so that an environment for performing predictive maintenance is created. Therefore, it is possible to reduce time and effort for condition settings or construction to be performed before actual operation. In addition, in a case where the detectors 220*a*, 220*b*, and 220*c* are added afterward, it is possible to acquire synchronized data from all the detectors 220*a*, 220*b*, and 220*c* in a group by setting the group for channels allocated to the added detectors 220*a*, 220*b*, and 220*c* in the setting information 330. The same applies to a case where the detectors 220*a*, 220*b*, and 220*c* are freely grouped afterward. That is, it is possible to ensure synchronization between data acquired from detectors freely grouped afterward. Then, it is possible to accurately and quickly identify an anomaly in the facility by making a diagnosis for the acquired data by use of the vibration analysis method and the MT method in combination.

Second Embodiment

Figure 6:
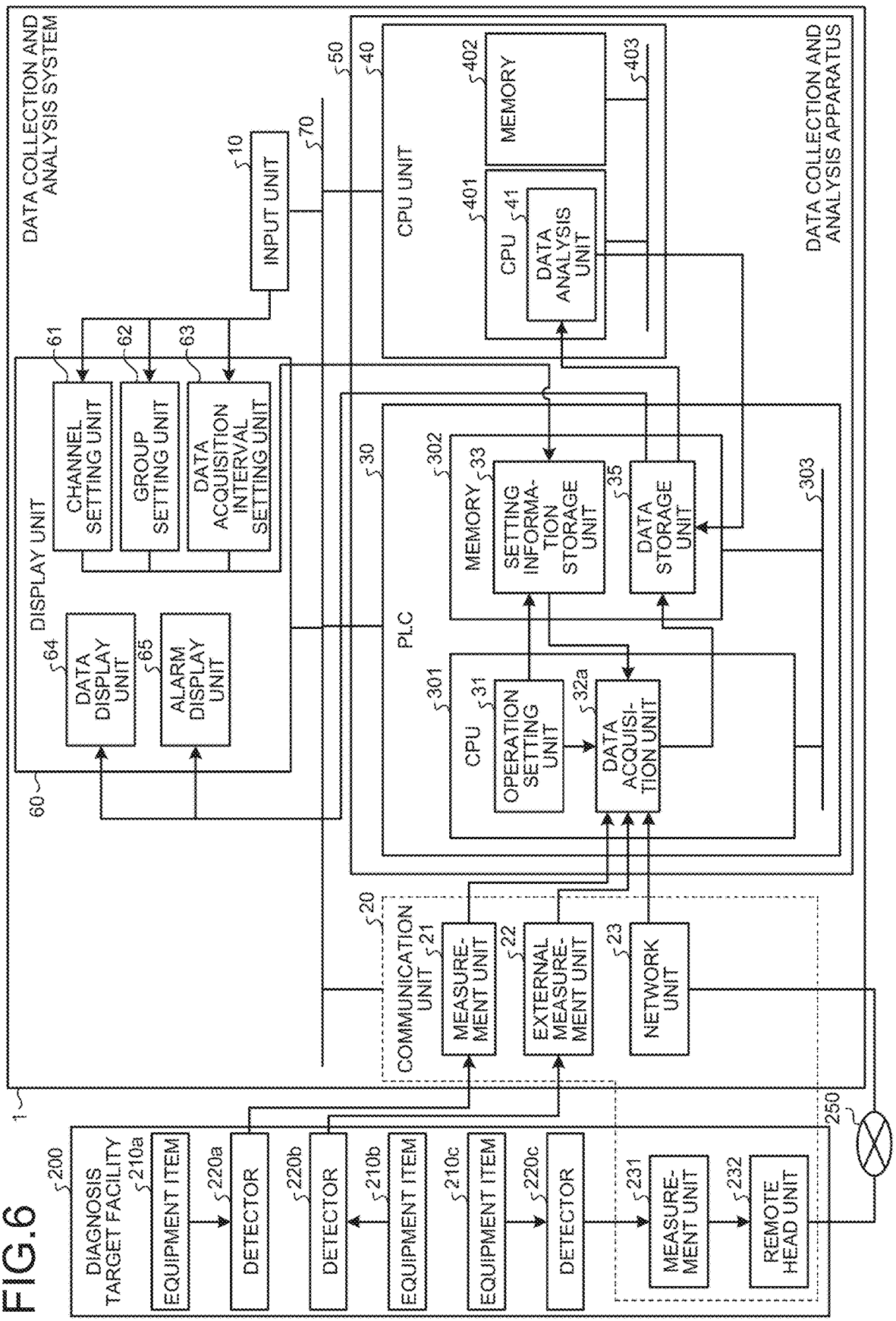
FIG. 6 is a block diagram schematically showing an example of a configuration of a data collection and analysis system according to a second embodiment.

FIG. 6 is a block diagram schematically showing an example of a configuration of a data collection and analysis system according to a second embodiment. Note that a difference from the first embodiment will be described below. In the following description, the same constituent elements as those in the first embodiment will be denoted by the same reference numerals, and description thereof will be omitted. In a data collection and analysis system 1*a* of the second embodiment, a data acquisition unit 32*a* has the function of the data type determination unit 34 according to the first embodiment. Therefore, the data type determination unit 34 has been removed from the PLC 30.

Figure 7:
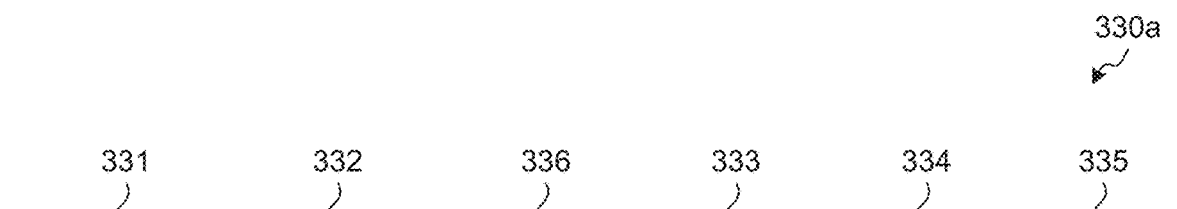
FIG. 7 is a diagram showing an example of setting information according to the second embodiment.

FIG. 7 is a diagram showing an example of setting information according to the second embodiment. In setting information 330*a* of FIG. 7, an item of a data type 336 has been added as compared with the setting information 330 of FIG. 2. The data type 336 indicates the type of data to be acquired through a channel indicated by the channel number 331. The data type 336 is information indicating whether the channel acquires data directly from the measurement unit 21 or the external measurement unit 22, or acquires data via the remote head unit 232. In the example of FIG. 7, in a case where data are acquired directly from the measurement unit 21 or the external measurement unit 22 without involving the remote head unit 232, the data type 336 is marked "direct". Meanwhile, in a case where data are acquired via the remote head unit 232, the data type 336 is marked "indirect".

The data acquisition unit 32a checks the group 332 of the setting information 330a, and selects channels belonging to the same group. The data acquisition unit 32a checks the data type 336 corresponding to each of the selected channels in the setting information 330a, and determines the data type 336 of each of the selected channels. Then, the data acquisition unit 32a sets data acquisition timing for the channels belonging to the same group.

Here, in a case where the data type 336 determined by the data acquisition unit 32a is "indirect", data acquisition will be delayed as compared with a case where the data type 336 is "direct", that is, a case where data are acquired not via the remote head unit 232. This is because data are acquired via the remote head unit 232 in the case where the data type 336 is "indirect". Therefore, the data acquisition unit 32a sets a data acquisition timing for each channel in consideration of an acquisition time difference caused by a difference between the data types 336 "indirect" and "direct". Then, the data acquisition unit 32a acquires data based on an interval defined in the acquisition interval 334 of the setting information 330, and stores the acquired data at a storage location in the data storage unit 35, indicated by the storage location 335 defined in the setting information 330a. That is, in the setting information 330a, the same data acquisition timing 333 is set for channels belonging to the same group, but a value obtained by correction of the data acquisition timing 333 is set for each channel. The correction of the data acquisition timing 333 is made in consideration of the acquisition time difference according to the data type 336.

In the second embodiment, the setting information 330a is provided with the data type 336 indicating whether data acquired by a channel pass through the remote head unit 232. In addition, the data acquisition unit 32a has the function of the data type determination unit 34. The data acquisition unit 32a sets a data acquisition timing for each of the measurement units 21 and 231 and the external measurement unit 22 in consideration of a time lag between data to be acquired not via the remote head unit 232 and data to be acquired via the remote head unit 232. This also achieves the same effects as those in the first embodiment.

Third Embodiment

In a third embodiment, a case where a single channel belongs to a plurality of groups will be described. In the third embodiment, the data collection and analysis system 1a having the same configuration as that in the second embodiment will be described as an example.

FIG. 8 is a diagram showing an example of setting information according to the third embodiment. Setting information 330b can associate a plurality of the groups 332 with a single channel having a certain channel number 331, as compared with the setting information 330a of the second embodiment. In the example of the setting information 330b shown in FIG. 8, a plurality of groups has been set for a channel with the channel number 331 of "4" and a channel with the channel numbers 331 of "7". The measurement unit 21 or 231 or the external measurement unit 22 connected to a channel is common regardless of the group 332. Therefore, the same value is set in the data type 336 for each group 332. In addition, the same value is also set in the acquisition interval 334 regardless of the group 332. Meanwhile, the data acquisition timing 333 and the storage location 335 are changed for each group 332. Therefore, the data acquisition timing 333 and the storage location 335 are set for each group 332. Note that the number of groups belonging to a single channel is not particularly limited. In addition, other configurations are the same as those described in the first and second embodiments, so that description thereof will be omitted.

In a case where a single channel belongs to a plurality of the groups 332, the data acquisition unit 32a specifies any one of the groups 332, and acquires data at the data acquisition timing 333 set for the specified group 332. The data acquisition unit 32a stores the acquired data at the storage location 335 in the data storage unit 35 indicated by the specified group 332. In specifying the group 332, the data acquisition unit 32a can specify, for example, an upper group 332 in the setting information 330b. Furthermore, in a case where the data acquisition timings 333 differ between the plurality of groups 332 associated with the single channel, the data acquisition unit 32a acquires data at the respective data acquisition timings 333 of the groups 332, and stores the acquired data in association with the groups 332 at a storage location in the data storage unit 35 indicated by the respective storage locations 335 of the groups 332. Also in this case, the data acquisition unit 32a changes the data acquisition timing for each channel according to the data type 336.

Note that while the case where a single channel is associated with a plurality of the groups 332 in the data collection and analysis system 1a of the second embodiment has been described here, the same applies to the data collection and analysis system 1 of the first embodiment. In the case of the data collection and analysis system 1 of the first embodiment, a plurality of the groups 332 can be associated with a single channel having a certain channel number 331 in the setting information 330 of FIG. 2. Then, with reference to the setting information 330, the data acquisition unit 32 selects the group 332, and sets the data acquisition timing 333 for the measurement units 21 and 231 and the external measurement unit 22.

In the third embodiment, a single channel is associated with a plurality of the groups 332 in the setting information 330b. The data acquisition unit 32a acquires data at the respective data acquisition timings 333 of the groups 332, and stores the acquired data in association with the groups 332 at the respective storage locations 335 of the groups 332, with reference to the setting information 330b. It is thus possible to acquire data belonging to the plurality of groups 332 from the single channel. As a result, when the same data are acquired from the same equipment item for different groups 332, it is not necessary to install a plurality of detectors, and a detector that acquires data can be shared among the plurality of groups 332. That is, the effect of physically enabling effective use of channels is achieved.

Fourth Embodiment

For example, when the data type determination unit 34 corrects a difference in data synchronization timing by using an estimated acquisition time difference in the first embodiment, it is desirable that the difference between the estimated acquisition time difference and an actually measured acquisition time difference be close to zero. In a fourth embodiment, a case will be described in which an acquisition time difference that changes according to the effect of, for example, the timing of a data interrupt is machine-learned and data acquisition time is corrected on the basis of a learning result.

In the fourth embodiment, the data type determination unit 34 of the PLC 30 further has the function of measuring actual acquisition time at which data are acquired via the remote head unit 232 and actual acquisition time at which data are acquired not via the remote head unit 232, and storing the measured acquisition time in the memory 302. Furthermore, the data analysis unit 41 of the CPU unit 40 further has the function of estimating an acquisition time difference between data to be acquired via the remote head unit 232 and data to be acquired not via the remote head unit 232. The data analysis unit 41 estimates an acquisition time difference between data to be acquired via the remote head unit 232 and data to be acquired not via the remote head unit 232 by using data acquired in the past, based on a statistical method such as the least mean square. The data analysis unit 41 outputs the estimated data acquisition time difference to the data type determination unit 34. The data type determination unit 34 corrects acquisition time at which data are acquired via the remote head unit 232, by using the estimated data acquisition time difference.

Figure 9:
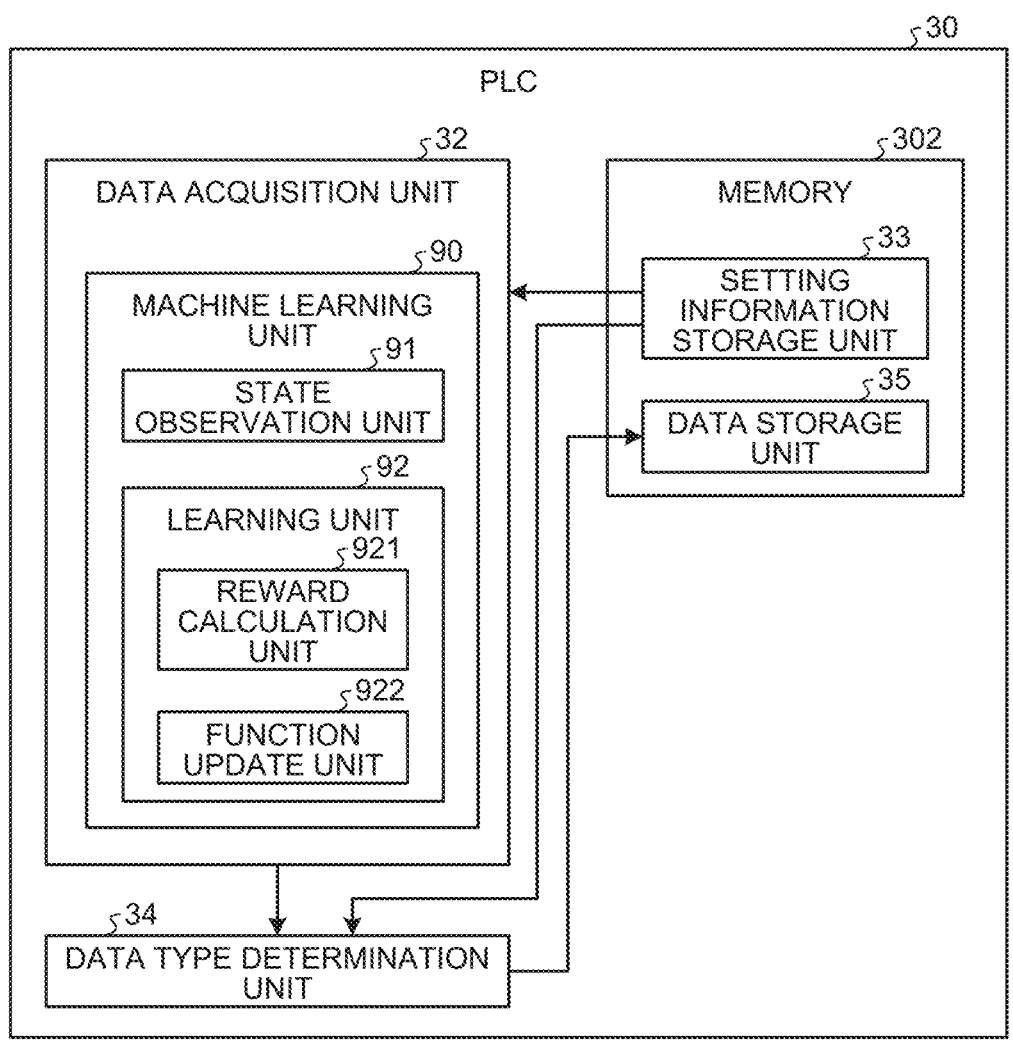
FIG. 9 is a block diagram schematically showing an example of a configuration of a PLC in a data collection and analysis system according to a fourth embodiment.

FIG. 9 is a block diagram schematically showing an example of a configuration of the PLC in a data collection and analysis system according to the fourth embodiment. The data acquisition unit 32 according to the fourth embodiment includes a machine learning unit 90. The machine learning unit 90 performs machine learning on an acquisition time difference caused by a difference between the data types "indirect" and "direct". The data acquisition unit 32 sets the data acquisition timing 333 on the basis of a result of the learning performed by the machine learning unit 90. The machine learning unit 90 includes a state observation unit 91 and a learning unit 92.

The state observation unit 91 observes, as state variables, an estimated value of the acquisition time difference, an actual measurement value of the acquisition time difference, and related information such as interrupt timing. The acquisition time difference is caused by the difference between "indirect" and "direct" corresponding to a distinction as to whether data have been acquired via the remote head unit 232. The estimated value of the acquisition time difference is obtained from the data analysis unit 41 of the CPU unit 40. The actual measurement value of the acquisition time difference is obtained from the data type determination unit 34. The related information such as interrupt timing is obtained from the setting information 330 of the setting information storage unit 33. Hereinafter, the estimated value of the acquisition time difference is referred to as an estimated acquisition time difference, and the actual measurement value of the acquisition time difference is referred to as an actually measured acquisition time difference. The related information such as interrupt timing is information such as interrupt timing at which an interrupt is generated to transmit data from the remote head unit 232, that causes a time lag in data synchronization. In one example, the related information such as interrupt timing is the data acquisition timing 333 of the setting information 330.

The learning unit 92 performs machine learning on a correction value for eliminating the acquisition time difference caused by the difference between "indirect" and "direct", according to a data set created on the basis of the state variables of the estimated acquisition time difference, the actually measured acquisition time difference, and the related information such as interrupt timing. Hereinafter, the correction value for eliminating the acquisition time difference is referred to as a correction value.

The learning unit 92 may use any learning algorithm. A case where reinforcement learning is applied will be described as an example. In reinforcement learning, an agent (action subject) in a certain environment observes a current state, and determines an action to be taken. The agent obtains a reward from the environment by selecting an action, and learns a measure that maximizes the reward through a series of actions. Q-learning and TD-learning are known as representative methods for reinforcement learning. For example, in the case of Q-learning, a general update formula (action value table) of an action value function Q(s,a) is expressed by formula (1) below.

[Formula 1]

$$Q(s_t, a_t) \leftarrow Q(s_t, a_t) + \alpha(r_{t+1} + \gamma \max_a Q(s_{t+1}, a) - Q(s_t, a_t)) \quad (1)$$

In formula (1), the symbol "$s_t$" represents an environment at time "t", and the symbol "$a_t$" represents an action at time "t". As a result of the action "$a_t$", the environment changes to "$s_{t+1}$". The symbol "$r_{t+1}$" represents a reward given according to a change in the environment, the symbol "γ" represents a discount rate, and the symbol "α" represents a learning coefficient. Note that γ is in a range of 0<γ≤1, and α is in a range of 0<α≤1. In a case where Q-learning is applied, the action "$a_t$" corresponds to calculation of the estimated acquisition time difference.

The update formula expressed by formula (1) increases an action value Q when the action value of the best action "a" at time "t+1" is larger than the action value Q of the action "a" taken at time "t", and decreases the action value Q in the opposite case. In other words, the action value function Q(s,a) is updated such that the action value Q of the action "a" at time "t" approaches the best action value at time "t+1". As a result, the best action value in a certain environment is sequentially propagated to action values in the previous environments.

The learning unit 92 further includes a reward calculation unit 921 and a function update unit 922.

The reward calculation unit 921 calculates a reward on the basis of the state variables. The reward calculation unit 921 calculates a difference between the estimated acquisition time difference and the actually measured acquisition time difference, and calculates a reward "r" on the basis of a result of comparison between the calculated difference and a reference value. For example, in a case where the difference between the estimated acquisition time difference and the actually measured acquisition time difference is equal to or less than the reference value as a result of calculating the estimated acquisition time difference for certain related information such as interrupt timing, the reward calculation unit 921 increases the reward "r" (for example, gives a reward of "1"). Meanwhile, in a case where the difference between the estimated acquisition time difference and the actually measured acquisition time difference exceeds the reference value as a result of calculating the estimated acquisition time difference for certain related information such as interrupt timing, the reward calculation unit 921 reduces the reward "r" (for example, gives a reward of "−1"). Note that the reference value is set in advance in calculation of the estimated acquisition time difference. The reference value is an index for determining whether the difference between the estimated acquisition time difference and the actually measured acquisition time difference is an allowable error in comparison with the actually measured acquisition time difference.

When the related information such as interrupt timing is input according to the reward calculated by the reward calculation unit 921, the function update unit 922 updates a function for determining an optimum correction value for the state. For example, in the case of Q-learning, the action value function $Q(s_t, a_t)$ expressed by formula (1) is used as a function for calculating the estimated acquisition time difference.

When the related information such as interrupt timing is input to the data type determination unit 34, the data acquisition unit 32 outputs an optimum correction value to the data type determination unit 34 by using a result of machine learning performed by the machine learning unit 90. Then, the data type determination unit 34 corrects acquisition time at which data are acquired via the remote head unit 232, by using the correction value.

Note that the case where reinforcement learning is applied to a learning algorithm to be used by the learning unit 92 has been described in the fourth embodiment, but the learning algorithm is not limited thereto. Not only the reinforcement learning, but also supervised learning, unsupervised learning, semi-supervised learning, or the like can be applied to the learning algorithm.

Furthermore, deep learning, in which extraction of a feature amount itself is learned, can be used as the above-described learning algorithm. Alternatively, machine learning may be performed according to another known method such as a neural network, genetic programming, function logic programming, or a support vector machine.

A machine learning apparatus that is the machine learning unit 90 is used for performing machine learning on a correction value of the data collection and analysis system 1. However, for example, the machine learning apparatus may be an apparatus provided separately from the data collection and analysis system 1 or 1a in such a way as to be connected to the data collection and analysis system 1 or 1a via a network. In addition, the machine learning apparatus may be built into the data collection and analysis system 1 or 1a. Moreover, the machine learning apparatus may be located on a cloud server.

In a case where the machine learning apparatus is an apparatus separate from the data collection and analysis system 1 or 1a, and is provided outside the data collection and analysis system 1 or 1a, the data type determination unit 34 just needs to have a learning result that is a learned model machine-learned by the machine learning apparatus or a function. Then, when information related to data interrupt timing is input to the learning result, the data type determination unit 34 calculates a correction value, and corrects acquisition time at which data collected via the remote head unit 232 are acquired, on the basis of the calculated correction value.

In addition, the learning unit 92 may perform machine learning on a correction value according to data sets created for a plurality of the data collection and analysis systems 1 and 1a. Note that the learning unit 92 may acquire the data sets from the plurality of data collection and analysis systems 1 and 1a to be used on the same site, or may perform machine learning on a correction value by using data sets collected from a plurality of the equipment items 210a, 210b, and 210c that operate independently on different sites. In addition, it is also possible to add the data collection and analysis system 1 or 1a to a target of data set collection on the way, or remove the data collection and analysis system 1 or 1a from the target on the contrary. Furthermore, a machine learning apparatus that has machine-learned a correction value for a certain data collection and analysis system 1 or 1a may be attached to another data collection and analysis system 1 or 1a, and may relearn and update a correction value for the another data collection and analysis system 1 or 1a.

Moreover, in the fourth embodiment, machine learning is performed on a correction value for eliminating the acquisition time difference caused by a difference between "indirect" and "direct" in the data type 336, but the present invention is not limited thereto. For example, in the third embodiment, in a case where a plurality of groups belongs to a single channel and data acquisition timing differs between the plurality of groups, machine learning may be performed on a correction value for a difference in data acquisition timing between a plurality of channels of the same group. In this case, the state observation unit 91 observes, as state variables, an estimated acquisition time difference and an actually measured acquisition time difference. The estimated acquisition time difference is an estimated value of an acquisition time difference between a plurality of channels belonging to the same group. The actually measured acquisition time difference is an actual measurement value of the acquisition time difference between the plurality of channels belonging to the same group.

The machine learning unit 90 is not limited to one provided in the PLC 30. The machine learning unit 90 may be a device external to the PLC 30. The machine learning unit 90 may be a device connectable to the PLC 30 via a network. The machine learning unit 90 may be a device located on a cloud server. In this case, a correction value output as a result of machine learning performed in the external machine learning apparatus is output to the data type determination unit 34 of the PLC 30. The data type determination unit 34 of the PLC 30 can correct acquisition time at which data are acquired via the remote head unit 232, by using the correction value output from the machine learning apparatus.

The configurations set forth in the above embodiments show examples, and it is possible to combine the configurations with another technique that is publicly known, or combine the embodiments with each other, and is also possible to make omissions and changes to part of the configurations without departing from the scope of the present invention.

REFERENCE SIGNS LIST 1, 1a data collection and analysis system; 10 input unit; 20 communication unit; 21, 231 measurement unit; 22 external measurement unit; 23 network unit; 30 PLC; 31 operation setting unit; 32, 32a data acquisition unit; 33 setting information storage unit; 34 data type determination unit; 35 data storage unit; 40 CPU unit; 41 data analysis unit; 60 display unit; 61 channel setting unit; 62 group setting unit; 63 data acquisition interval setting unit; 64 data display unit; 65 alarm display unit; 70 bus line; 90 machine learning unit; 91 state observation unit; 92 learning unit; 200 diagnosis target facility; 210a, 210b, 210c equipment item; 220a, 220b, 220c detector; 232 remote head unit; 250 network; 921 reward calculation unit; 922 function update unit.

The invention claimed is:

1. A data collection and analysis system to diagnose an equipment item at a user side for predictive maintenance based on an internal state or operation state of the equipment item, the data collection and analysis system comprising:
   a communicator to collect data from the equipment item connected to the data collection and analysis system via wiring and/or a network, the data indicating the internal state or the operation state of the equipment item; and a data acquisition circuitry having a plurality of channels to acquire, from the communicator, the data synchronized on a per-group basis for each of a plurality of groups according to setting information, wherein the setting information is information in which a channel number, a group, a data acquisition timing, an acquisition interval, and a storage location of the data, are set for a channel allocated to the data to be acquired from the equipment item, wherein each of the plurality of groups includes a grouping together a plurality of the channels having a same data acquisition timing, wherein the data acquisition timing is a timing at which the data are acquired from the communicator, and wherein acquiring the data synchronized for each of the plurality of groups by the data acquisition circuitry is to perform the diagnosis of the equipment item at the user side for the predictive maintenance based on the internal state or the operation state of the equipment item.

2. The data collection and analysis system according to claim 1, wherein the data acquisition circuitry sets the data acquisition timing in the communicator according to the setting information, and acquires, from the communicator, the data synchronized for each of the groups.

3. The data collection and analysis system according to claim 1, wherein the data acquisition circuitry achieves synchronization between the groups in terms of time at which the data have been acquired, according to the setting information.

4. The data collection and analysis system according to claim 1, wherein the same data acquisition timing and a same storage location of the data are set in the setting information for the channels belonging to a same group of the plurality of groups.

5. The data collection and analysis system according to claim 1, wherein the communicator has a function of collecting the data from the equipment item via the wiring, and a function of collecting the data from the equipment item via a remote station, the remote station transmitting the data from the equipment item to the communicator via the network, and the data collection and analysis system further comprises a data type determination circuitry to determine whether the data are data collected via the remote station, and correct acquisition time at which the data collected via the remote station are acquired, according to a result of the determination, the data collected via the remote station being among data acquired at the data acquisition timing.

6. The data collection and analysis system according to claim 1, wherein the communicator has a function of collecting the data from the equipment item via the wiring, and a function of collecting the data from the equipment item via a remote station, the remote station transmitting the data from the equipment item to the communicator via the network, the setting information further includes a data type set for the channel, the data type indicating whether the data are data collected via the remote station, and when acquiring the data for each group in the setting information, the data acquisition circuitry corrects the data acquisition timing for each of the channels included in the group according to the data type in the setting information.

7. The data collection and analysis system according to claim 1, further comprising:

a data analysis circuitry to analyze, for each of the plurality of groups, the data acquired by the data acquisition circuitry; and a data display to display, for each of the plurality groups, a result of analysis of the data performed by the data analysis circuitry.

8. The data collection and analysis system according to claim 1, wherein the channel is associated with the plurality of the groups in the setting information.

9. The data collection and analysis system according to claim 5, wherein when information related to interrupt timing for the data is input, the data type determination circuitry corrects the acquisition time at which the data collected via the remote station are acquired, by using a result of machine learning.

10. The data collection and analysis system according to claim 9, comprising:

a state observation circuitry to observe, as state variables, an estimated value and actual measurement value of an acquisition time difference, and the information related to the interrupt timing for the data at which an interrupt is generated by the remote station, the acquisition time difference being a difference between time at which the data are acquired not via the remote station and time at which the data are acquired via the remote station; and a learning circuitry to perform machine learning on a correction value for correcting the acquisition time at which the data are acquired via the remote station, according to a data set created based on the state variables.

11. The data collection and analysis system according to claim 5, comprising:

a state observation circuitry to observe, as state variables, an estimated value of an acquisition time difference, an actual measurement value of the acquisition time difference, and information related to interrupt timing for the data at which an interrupt is generated by the remote station, the acquisition time difference being a difference between time at which data are acquired not via a remote station and time at which the data are acquired via the remote station; and a learning circuitry to perform machine learning on a correction value for correcting acquisition time at which the data are acquired via the remote station, according to a data set created based on the state variables.

12. The data collection and analysis system according to claim 11, wherein the learning circuitry includes:

a reward calculation circuitry to calculate a reward based on a result of comparison between a reference value and a difference between the estimated value of the acquisition time difference and the actual measurement value of the acquisition time difference for the information related to the interrupt timing for the data; and a function update circuitry to update a function for determining the correction value for correcting the acquisition time at which the data are acquired for the information related to the interrupt timing for the data, based on the reward.

13. A data collection and analysis apparatus to diagnose an equipment item at a user side for predictive maintenance based on an internal state or operation state of the equipment item, the data collection and analysis apparatus comprising: a data acquisition circuitry having a plurality of channels to acquire, from a communicator, data synchronized on a per-group basis for each of a plurality of groups according to setting information, the communicator acquiring the data from the equipment item connected to the data collection and analysis apparatus via wiring and/or a network, the data indicating the internal state or the operation state of the equipment item, the setting information being information in which a channel number, a group, a data acquisition timing, and a storage location of the data, are set for a channel allocated to the data to be acquired from the equipment item, each of the plurality of groups grouping together a plurality of channels having a same data acquisition timing, the data acquisition timing being a timing at which the data are acquired from the communicator; and a data analysis circuitry to analyze, for each of the plurality of groups, the data acquired by the data acquisition circuitry, wherein, acquiring the data synchronized for each of the plurality of groups by the data acquisition circuitry is to perform the diagnosis of the equipment item at the user side for the predictive maintenance based on the internal state or the operation state of the equipment item.

14. A data collection and analysis method to diagnose an equipment item at a user side for predictive maintenance based on an internal state or operation state of the equipment item, the data collection and analysis method comprising: causing a programmable logic controller having a plurality of channels to acquire, from a communicator, data synchronized on a per-group basis for each of a plurality of groups according to setting information, the communicator acquiring the data from the equipment item connected to a data collection and analysis system via wiring and/or a network, the data indicating the internal state or the operation state of the equipment item, the setting information being information in which a channel number, a group, a data acquisition timing, and a storage location of the data, are set for a channel allocated to the data to be acquired from the equipment item, each of the plurality of groups grouping together a plurality of channels having a same data acquisition timing, the data acquisition timing being a timing at which the data are acquired from the communicator; and causing an arithmetic circuitry to analyze the acquired data for each of the plurality of groups, wherein, acquiring the data synchronized for each of the plurality of groups is to perform the diagnosis of the equipment item at the user side for the predictive maintenance based on the internal state or the operation state of the equipment item.

15. The data collection and analysis apparatus according to claim 13, wherein the data acquisition circuitry sets the data acquisition timing in the communicator according to the setting information, and acquires, from the communicator, the data synchronized for each of the plurality of groups.

16. The data collection and analysis apparatus according to claim 13, wherein the data acquisition circuitry achieves synchronization between the plurality of groups in terms of time at which the data have been acquired, according to the setting information.

17. The data collection and analysis apparatus according to claim 13, wherein the same data acquisition timing and a same storage location of the data are set in the setting information for the channels belonging to a same group of the plurality of groups.

18. The data collection and analysis apparatus according to claim 13, wherein
the communicator has a function of collecting the data from the equipment item via the wiring, and a function of collecting the data from the equipment item via a remote station, the remote station transmitting the data from the equipment item to the communicator via the network, and
the data collection and analysis apparatus further comprises a data type determination circuitry to determine whether the data are data collected via the remote station, and correct acquisition time at which the data collected via the remote station are acquired, according to a result of the determination, the data collected via the remote station being among data acquired at the data acquisition timing.

19. The data collection and analysis method according to claim 14, further comprising, when information related to interrupt timing for the data is input, correcting the acquisition time at which the data collected via a remote station are acquired, by using a result of machine learning.

20. The data collection and analysis method according to claim 14, further comprising:
collecting the data from the equipment item via the wiring, and collecting the data from the equipment item via a remote station, the remote station transmitting the data from the equipment item to the communicator via the network, and
determining whether the data are data collected via the remote station, and correcting acquisition time at which the data collected via the remote station are acquired, according to a result of the determination, the data collected via the remote station being among data acquired at the data acquisition timing.

* * * * *